United States Patent [19]

Heraud et al.

[11] Patent Number: 5,079,039
[45] Date of Patent: Jan. 7, 1992

[54] METHOD FOR PRODUCING A CERAMIC MATRIX COMPOSITE MATERIAL HAVING IMPROVED TOUGHNESS

[75] Inventors: Louis Heraud, Bordeaux; Roger Naslain; J. Michel Quenisset, both of Pessac, all of France

[73] Assignee: Societe Europeenne de Propulsion, Suresnes, France

[21] Appl. No.: 484,110

[22] Filed: Feb. 23, 1990

[30] Foreign Application Priority Data

Mar. 2, 1989 [FR] France .................................. 89 02718

[51] Int. Cl.$^5$ ................................................. C23C 3/08
[52] U.S. Cl. ...................................... 427/249; 427/255; 427/255.7; 427/294; 427/380; 427/419.2; 427/419.7
[58] Field of Search ............ 427/243, 249, 255, 255.7, 427/294, 419.7, 419.2, 380

[56] References Cited

U.S. PATENT DOCUMENTS

| | | | |
|---|---|---|---|
| 4,580,524 | 4/1986 | Lackey, Jr. et al. | 118/725 |
| 4,724,169 | 2/1988 | Keen | 427/255.7 |
| 4,735,856 | 4/1988 | Schultz et al. | 427/255.7 |
| 4,752,503 | 6/1988 | Thebault | 427/255.7 |
| 4,766,013 | 8/1988 | Warren | 427/255.7 |

FOREIGN PATENT DOCUMENTS 0121797 of 0000 European Pat. Off. .

OTHER PUBLICATIONS

Ceramic Engineering and Science Proceedings: Proceedings of the 9th Annual Conference, "Development of a New, Faster Process for the Fabrication of Ceramic Fiber-Reinforced Ceramic Composites by Chemical Vapor Infiltration", Cocoa Beach, Fla., 20-23 Jan. 1985, vol. 6, Nos. 7/8, Jul./Aug. 1985, pp. 694-706.

*Primary Examiner*—Janyce Bell
*Attorney, Agent, or Firm*—Weingarten, Schurgin, Gagnebin & Hayes

[57] ABSTRACT

A porous structure made of refractory fibers or densified by carrying out a sequential deposition of a matrix, the deposition comprising at least two chemical vapor infiltration phases of an essentially ceramic material separated by a chemical vapor infiltration of a less rigid material chosen among pyrolytic carbon and boron nitride.

10 Claims, 2 Drawing Sheets

5,079,039

METHOD FOR PRODUCING A CERAMIC MATRIX COMPOSITE MATERIAL HAVING IMPROVED TOUGHNESS

BACKGROUND OF THE INVENTION

The present invention relates to the production of ceramic matrix composite materials, i.e. materials formed by a refractory fiber reinforcement structure densified by a ceramic matrix.

The term refractory fiber reinforcement structure refers to a two- or three-dimensional structure formed of fibers essentially consisting of carbon or a ceramic material, such as silicon carbide, alumina, zircona . . . . The ceramic matrix is deposited within the pores of the reinforcement structure by liquid impregnation or chemical vapor infiltration (CVI).

Ceramic matrix composite materials have particular uses in applications requiring high thermo-mechanical properties, such as space technology. In comparison with carbon-carbon composite materials used in the same applications, they have the advantage of better oxidation resistance at high temperatures.

It is nevertheless desirable—and this is the object of the present invention—to improve some mechanical properties of ceramic matrix materials, and in particular their toughness, by raising their damage threshold, reducing their flaw sensitivity and increasing their shear strength.

SUMMARY OF THE INVENTION

The above object is attained through a method for producing a ceramic matrix composite material comprising the steps of forming a porous reinforcement structure from refractory fibers and densifying the said reinforcement structure by chemical vapor infiltration within the pores of the reinforcement structure, wherein, according to the invention, said matrix infiltration is obtained in a sequential manner and comprises at least two phases of chemical vapor infiltration of an essentially ceramic material separated by a phase of chemical vapor infiltration of a less rigid material chosen among pyrolytic and boron nitride.

The sought-after increase in toughness is obtained by the forming of a sequenced—or laminated—matrix with one or more low-rigidity interfacial layers each interposed between relatively rigid ceramic material layers.

Indeed, should a crack appear in the ceramic material, the interposition of a less rigid material, would slow down its propagation by a spreading of the strains, or by a change from a fracture mode within the ceramic material to another fracture mode with a spreading of the strains and a diversion of the crack, within the less rigid material.

It is particularly advantageous to use for the lower-rigidity interfacial layer(s) a material chosen among boron nitride and pyrolytic carbon, especially laminar pyrolytic carbon, since such a material has a high elastic shear stress.

Thus, by interposing one or more less rigid interfacial layers within the matrix, incipient cracks are retarded, the fracture energy is increased, and the flaw sensitivity of the composite material is lowered.

Moreover, the discrete structure of the matrix achieved by the sequencing reduces probability of the presence of defects likely to initiate a crack.

The formation of the constituent layers of the matrix by chemical vapor infiltration forms one of the essential characteristics of the invention. Indeed, this technique lends itself particularly well to the manufacture of sequenced matrices since it allows simple and accurate control of the composition of the deposited material by acting on the nature of the gas introduced into the infiltration chamber as well as on a variety of parameters (temperature, total pressure, partial pressure of the chemical species and flowrates), something that is not always possible with other techniques such as liquid impregnation.

Furthermore, chemical vapor infiltration makes it possible to obtain a precise control, not only of the nature of the different layers forming the matrix, but also of the transitions between layers: abrupt discontinuities with a correspondingly abrupt change in rigidity, or a gradual transition with a gradual change in rigidity.

Advantageously, the chemical vapor infiltration is carried out in a pulsed mode, a technique known in itself and which reduces the inhomogeneities in the coatings of the different layers.

Advantageously again, the coatings formed within the matrix by chemical vapor infiltration of an essentially ceramic material have a greater thickness than the coatings formed by chemical vapor infiltration of pyrolytic carbon or boron nitride. There is no need for the latter to exceed a thickness of 2 microns.

BRIEF DESCRIPTION OF THE DRAWINGS

There shall now be given a more detailed description of specific ways for carrying out the inventive method, with reference to the appended drawings in which.

DETAILED DESCRIPTION OF THE PREFERRED EMBODIMENTS

According to the inventive method, the process steps relating to the formation of the composite material matrix involve an alternation between depositing a ceramic layer by chemical vapor phase infiltration and depositing a pyrolytic carbon (PyC) or boron nitride (BN) interfacial layer, also by chemical vapor infiltration.

This alternation can be obtained by successive infiltrations in separate installations.

Figure 1:
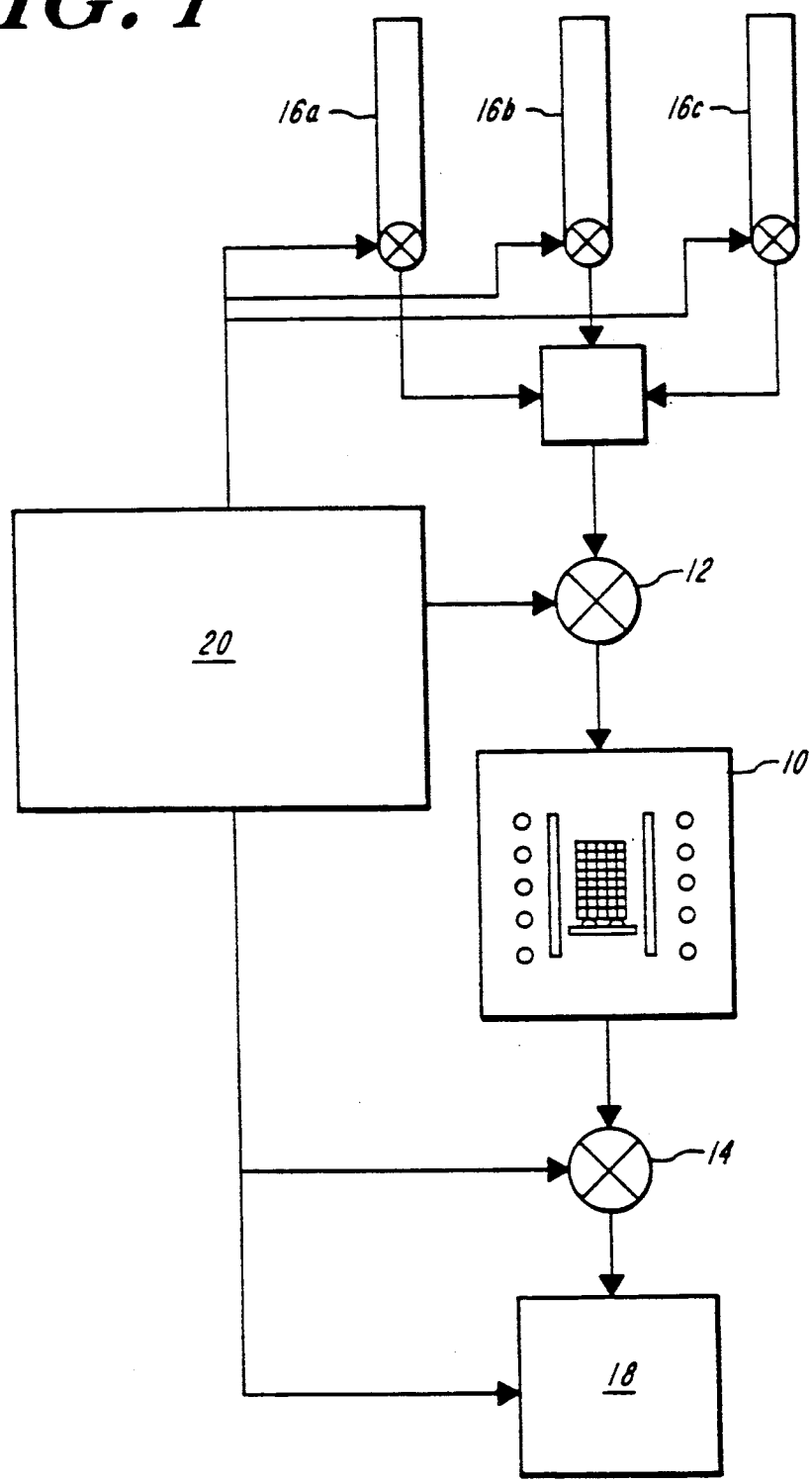
FIG. 1 is a diagram showing an example of a chemical vapor infiltration installation capable of implementing the method according to the invention.

Preferably, a single chemical vapor infiltration installation operating in pulsed mode is used, e.g. as shown in FIG. 1, since such an installation advantageously makes it possible to achieve this alternation in the coatings through continuous process that does not require handling and is automatic, fast and economical. This installation comprises an infiltration chamber 10 fitted with a gas inlet valve 12 and a gas exhaust valve 14.

During an operating cycle of the installation, a given volume of reactive gas or gas mixture yielding the required coating is drawn from one or several precursor gas tanks, such as 16a, 16b, 16c and admitted into the chamber 10 by opening the inlet valve 12, the exhaust valve 14 being closed. The gas or gas mixture resides in the chamber 10 for a predetermined time period, the inlet and exhaust valves 12 and 14 being closed. The chamber 10 is then emptied by opening the exhaust valve 14, the inlet valve 12 being closed. The residual gases are extracted from the chamber 10 by means of a pump circuit 18. The admission and evacuation control of the gases and their residues is carried out by a control unit 20 that actuates the valves and pump circuit 18, as well as the gas outlet valves for the tanks 16a, 16b and 16c.

The above-described example makes it possible to deposit coatings sequentially, each coating having different compositions and being formed in one or more cycles.

There will now be described in detail two practical examples of the method according to the invention, relating to SiC—SiC composite materials, i.e. materials in which the reinforcement structure and the matrix are essentially made of silicon carbide.

EXAMPLE 1

A reinforcement structure is produced by piling laminations of dry webs formed of fibers made essentially of silicon carbide, such as the fibers sold by Nippon Carbon Co. of Japan under the trade name "Nicalon", the piled laminations being held in position by a graphite tool to form a porous fibrous structure with a 35% volume percentage of fibers (i.e. percentage of the total volume occupied by the fibers equals 35%).

According to the invention, the reinforcement structure is densified by a sequenced matrix deposited by chemical vapor infiltration.

To that end, the reinforcement structure maintained by the tool is placed in an infiltration oven in which the conditions necessary to form the desired successive depositions are established sequentially.

In the present example, the matrix is obtained by successive depositions of a silicon carbide (SiC) layer on the fibers of the reinforcement fiber, followed by a laminar pyrolytic carbon (PyC) interfacial layer and, finally, a new SiC layer.

The conditions for depositing SiC by chemical vapor infiltration are well known and described in patent FR-2 401 888. For instance the deposition can in particular be obtained by means of a reactive gas mixture containing methyl chlorosilane ($CH_3SiCL_3$) and hydrogen ($H_2$) at a temperature of around 900° C., the total pressure in the infiltration chamber being about 20 torrs and the partial pressures of $CH_3SiCl_3$ and $H_2$ being 5 torrs and 15 torrs respectively.

The conditions for depositing laminar PyC are also well known. Such a deposition can be obtained by methane gas ($CH_4$) infiltration at reduced pressure (about 10 torrs), at a temperature of around 1000° C.

The process used for the chemical vapor infiltration of SiC and laminar PyC is of the pulsed type and carried out in an installation such as the one shown in FIG. 1, which allows the SiC and laminar PyC to be deposited sequentially.

The transitions between the first SiC layer, and the laminar PyC layer, and between the latter and the second SiC layer are in this example performed abruptly by changing the deposition conditions, namely the nature of the gas or gaseous mixture introduced into the chamber, and possibly pressure and temperature. There is thus obtained a sequenced matrix with a sudden transition in rigidity between the SiC layers and the laminar PyC layer.

The first SiC layer made on the fibers of the reinforcement structure is performed in view of reducing the porosity of the latter from an initial value of 65% to 35%. Laminar PyC layers are then made on three different parts of this first porous composite by chemical vapor infiltration operations totalling 2, 12 and 24 hours respectively. At the end of these infiltrations, the layer thicknesses are substantially equal to 0.2, 1 and 2 microns. The second SiC layer is finally formed on the different parts by continuing the chemical vapor infiltration until a residual porosity of 15% is attained.

Figure 2:
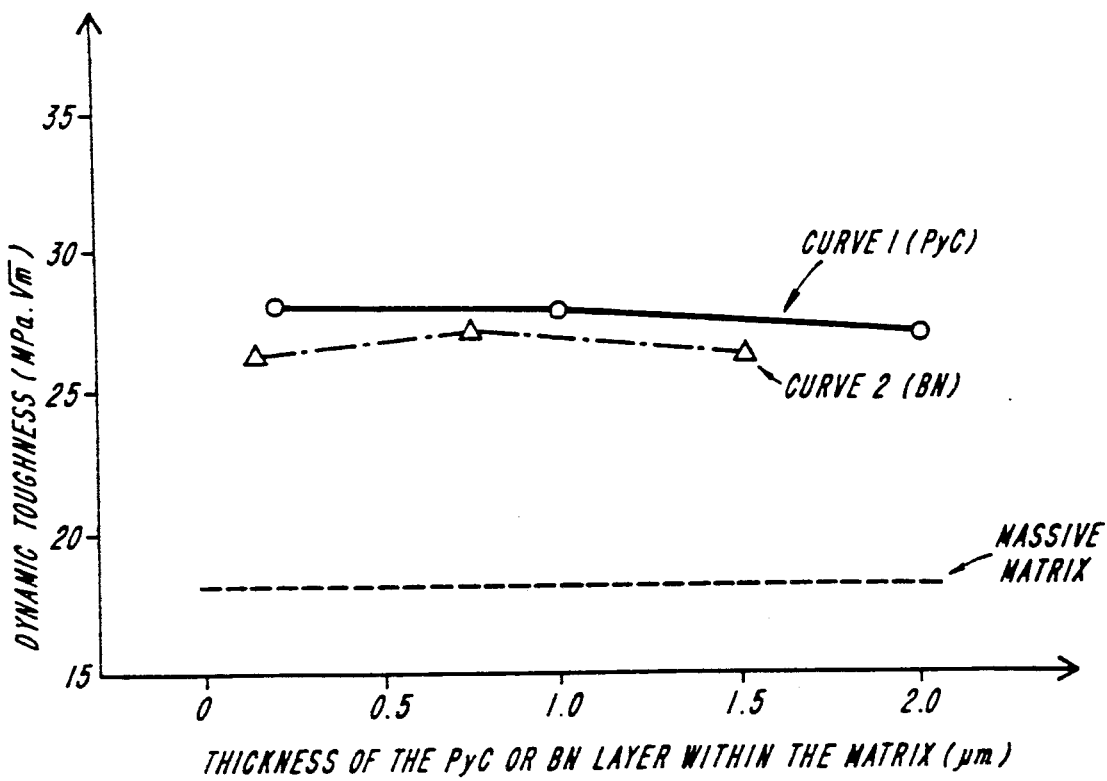
FIG. 2 shows curves of dynamic toughness versus thickness of an interfacial layer within the matrix, for two composite materials obtained by a process according to the present invention.

Impact tests using a conventional Charpy hardness drop tester on notched test samples subject to a three point flexural stress yield curve 1 of FIG. 2, giving the critical dynamic strain intensity factor, also termed dynamic toughness, as a function of the thickness of the PyC layer.

For comparison, there is shown the value obtained with an SiC—SiC composite obtained in the same way as described above except for the interfacial PyC laminar layer within the matrix.

It will be noticed that the measured dynamic toughness depends little on the thickness of the PyC layer within the range in question, while the presence of that layer within the matrix makes it possible to greatly improve this toughness compared with a SiC—SiC composite material devoid of such a layer: the values are in the region of 28 MPa.m$^{\frac{1}{2}}$ for the former in contrast with 18 MPa.m$^{\frac{1}{2}}$ for the latter.

Figure 3:
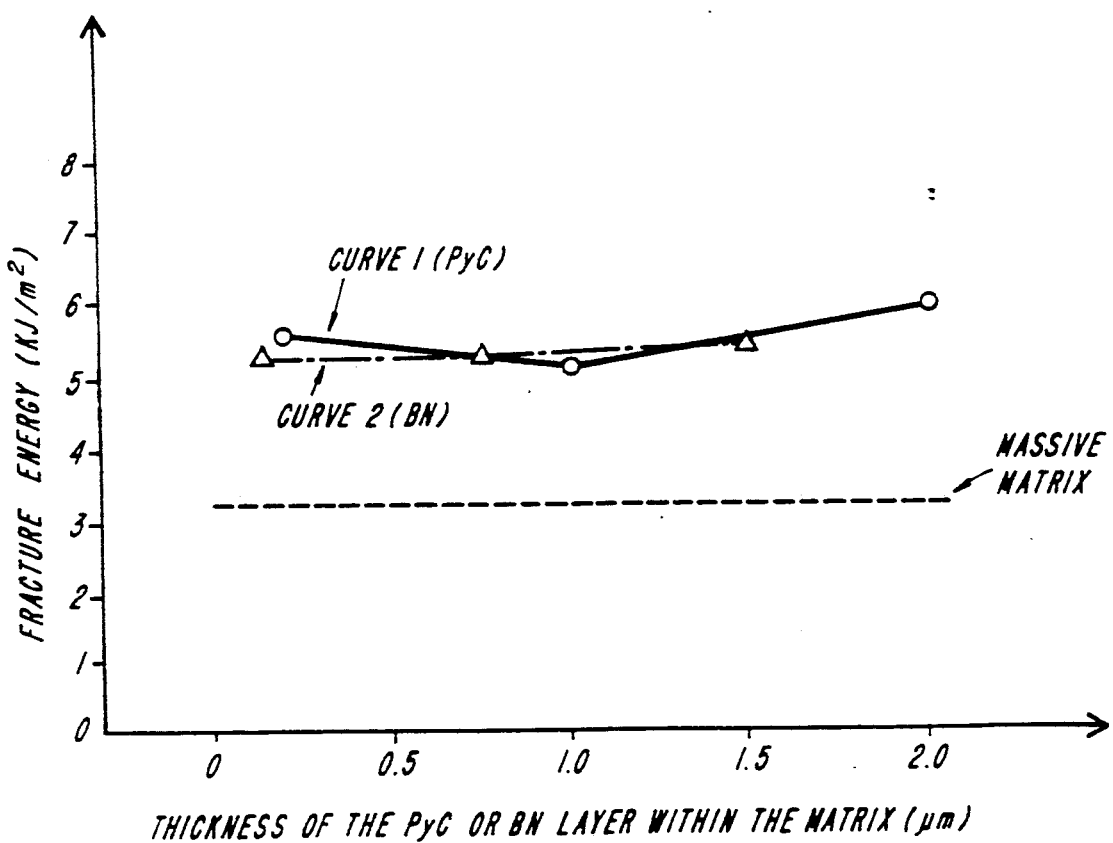
FIG. 3 shows curves of fracture energy versus thickness of an interfacial layer within the matrix, for two composite materials obtained by a process according to the present invention.

These same tests can be used to measure the overall fracture energy, by integration of the force-time curve. On curve 1 of FIG. 3, calculated energy is plotted for the different thickness values of the PyC layer within the matrix and, for comparison, the energy is also calculated for an SiC—SiC composite material without an interfacial layer within the matrix.

It can be observed that there is a large increase in the fracture energy when a PyC layer is interposed within the matrix.

EXAMPLE 2

An SiC—SiC type composite material is produced as described in example 1, except that the laminar PyC interfacial layer is replaced by a boron nitride layer, also obtained by chemical vapor infiltration.

BN layers having respective thicknesses of 0.15, 0.75 and 1.5 microns were produced on three parts of the first, 35% porosity composite by chemical vapor infiltrations over time periods of 4, 24 and 48 hours respectively.

As in the preceding example, the second SiC layer was then produced until each part of the composite had attained a residual porosity in the region of 15%.

The fracture energies are substantially equal to those calculated for example 1, and hence considerably greater than for composite materials having a non-sequenced matrix.

Although there has only been considered up to now the formation of a sequenced matrix with just one interfacial layer of lower rigidity between two relatively rigid ceramic layers, it goes without saying that the number of interfacial layers can be increased by a successive alternation of a ceramic layer and a PyC or BN layer, the final layer being a ceramic layer, so giving rise to a more marked laminar structure. Moreover, in addition to one or several PyC or BN interfacial layers within the matrix, it is feasible to form such a layer on the fibers, as described in U.S. Pat. No. 4,752,503.

Furthermore, as already explained, the transition between layers of different natures and rigidities within the matrix can be produced abruptly as in the above described example, or gradually. The graduality of the transition is obtained by modifying the deposition conditions in a non-abrupt manner. Thus, referring to the case of a transition from an SiC layer to a PyC layer, for instance, a non-abrupt transition is obtained by progressively modifying the composition of the gases introduced in the infiltration chamber and, if needs be, the other deposition parameters (temperature, pressure and flowrate), so that a concomitant SiC+PyC layer is formed between the layers.

Finally, the process according to the invention naturally applies to the production of a composite material with a ceramic matrix other than SiC—SiC, so long, of course, that the ceramic material of the matrix is amenable to chemical vapor infiltration.

Accordingly, it is possible to have the fibers of the reinforcement structure made of a material other than SiC, e.g. carbon, silicide, alumina, zircona, etc. on the one hand, and a matrix obtained by chemical vapor infiltration of a ceramic material other than SiC, e.g. alumina, zircona, carbide or other nitride, on the other hand.

What is claimed is:

1. A method for producing a ceramic matrix composite material having improved toughness, comprising the steps of:
   providing a porous reinforcement structure from refractory fibers;
   forming a ceramic layer by chemical vapor infiltration of an essentially ceramic material into the reinforcement structure;
   forming a less rigid layer over said ceramic layer by chemical vapor infiltration of a material selected from the group consisting of pyrolytic carbon and boron nitride; and
   alternating between said steps of forming said ceramic layer and forming said less rigid layer in a sequential reiterative manner, whereby the ceramic matrix composite material is formed.

2. The method of claim 1, wherein in said step for forming said layer of less rigid material said less rigid material is laminar pyrolytic carbon.

3. The method of claim 1, wherein said layers formed by chemical vapor infiltration of an essentially ceramic material have a greater thickness than said layer of less rigid material.

4. The method of claim 1 wherein in said step of forming said less rigid layer the layer formed of less rigid material has a thickness not exceeding 2 microns.

5. The method of claim 1, wherein said chemical vapor infiltration in said layer forming steps is carried out by a pulsed type process.

6. The method of claim 1 wherein said refractory fibers in said step of providing a porous reinforcement structure are comprised of silicon carbide.

7. A method for producing a ceramic matrix composite material having improved toughness, comprising the steps of:
   providing a deposition oven;
   placing a porous reinforcement structure comprised of refractory fibers into the deposition oven;
   depositing a layer of a ceramic, said ceramic comprising at least one material selected from the group consisting of carbon, silicon carbide, alumina, and zirconium, on said porous reinforcement structure by chemical vapor infiltration in said deposition oven;
   depositing by chemical vapor infiltration in said deposition oven on said ceramic a further layer comprised of material selected from the group consisting of pyrolytic carbon and boron nitride; and
   alternating between said deposition layering steps in a sequential reiterative manner, whereby the ceramic matrix composite material is formed.

8. The method of claim 7 wherein the step of depositing the ceramic layer further comprises changing the heat and pressure in said oven.

9. The method of claim 7 wherein the step of depositing the layer comprised of material selected from the group consisting of pyrolytic carbon and boron nitride further includes changing the heat and pressure in said oven.

10. The method of claim 7 wherein both of said layer forming steps further comprise changing the heat and pressure in said oven, and further wherein said heat and pressure conditions associated with each of said layer forming steps are different from each other.

* * * * *